May 1, 1928. 1,668,398
T. ERISMANN
TIRE VALVE
Filed April 11, 1927
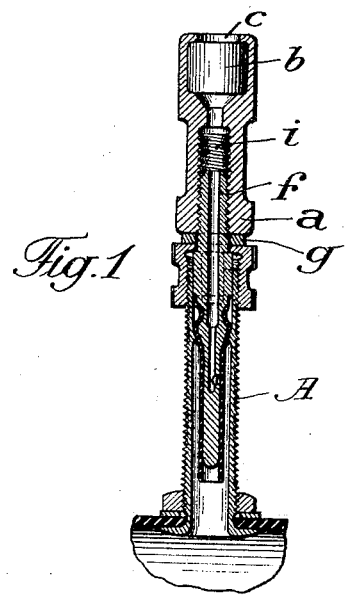
Fig.1
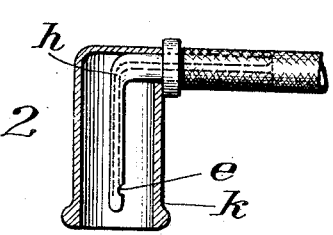
Fig.2
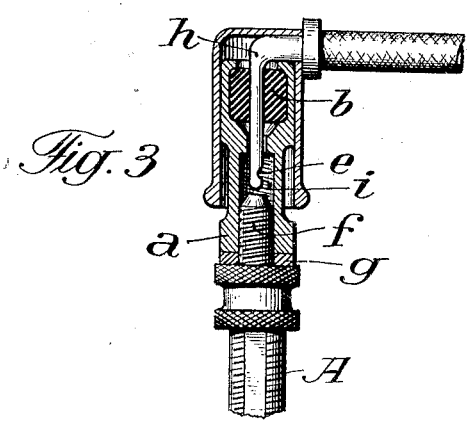
Fig.3
Inventor
Theodor Erismann,
By
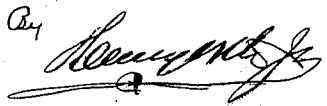
Atty.

Patented May 1, 1928.

1,668,398

UNITED STATES PATENT OFFICE.

THEODOR ERISMANN, OF BONN, GERMANY.

TIRE VALVE.

Application filed April 11, 1927, Serial No. 182,854, and in Germany April 21, 1926.

For coupling the tire valve with the nozzle of the air pump and for protecting the valve against dust after the coupling has been removed a number of arrangements, besides that involving a screwing together of the parts for coupling purposes and the use of a protective cap, are known intended to facilitate the necessary handling. Some of them permit coupling of the tire valve with the nozzle of the air pump by three movements, (i. e. the cap is lifted, the coupling part of the air pump is applied to the cap, whereupon the cap is lowered for effecting the coupling).

Further it has been proposed to construct the metallic nut, by means of which the valve cone is pressed against its seat in the valve casing, as a closing head having a closable bore into which the needle shaped end of the air pump is inserted.

These arrangements do not show the greatest possible simplicity as compared with the usual cap protecting against dust which is screwed to the tire valve, which would permit by a simple pressure or tension movement to obtain a release of the dust protection and a simultaneous coupling as well as a release of the coupling and the provision of a simultaneous dust protection. Moreover with all the known arrangements it is necessary to come into contact with parts covered with dust when coupling or when uncoupling, which sometimes is very unpleasant. Furthermore in that case in which a metallic conical needle has to be inserted into a metallic sheath for coupling the parts, the smallest particle of dirt on the coupling faces destroys the air tightness of the coupling.

Further it has been proposed to overcome these disadvantages by replacing the usual valve by a special device in the protective tire between rubber edges of which pressed in an air-tight manner against each other, the thin needle-shaped nozzle of the air pump may be inserted, whereby the return flow of the compressed air into the air pump is prevented by a separate valve provided in the air pump. This construction requires a tire of a special type and cannot be used with the tires at present in general use.

There exists no doubt the necessity of having a coupling device combined with a dust protection which removes the above mentioned disadvantages and which is applicable without any alteration to the known types of valves and which permits to effect in the cleanest and quickest way the coupling as well as the uncoupling (with a simultaneous removal and re-establishment of the protection against dust) by simply pressing (or pulling respectively) the nozzle of the air pump without touching any dirty parts of the wheel with the hand. It is the object of the present invention to attain this aim.

The device according to the present invention comprises a simple sleeve adapted to be screwed to the end of the valve body projecting beyond the rim the free end of which sleeve is closed by a rubber plug or a rubber diaphragm respectively pierced through in the center; the extension of the air pump adapted to cooperate therewith consists of a needle with a blunt point and provided with a longitudinally extending bore ending near the needle point and permitting the air from the air pump to enter into the valve.

A constructional example of the subject matter of the present invention is illustrated on the accompanying drawings, in which:

Fig. 1 shows the tire valve provided with the coupling sleeve,

Fig. 2 shows the needle at the end of the air pump, and

Fig. 3 shows the coupling sleeve and the needle of the air pump inserted in the former.

$a$ denotes the sleeve screwed to the projecting end $f$ of the valve A, $i$ is the air channel, $b$ is the rubber plug pierced through at $c$, $h$ the needle provided with the air channel $d$ ending laterally at $e$, $g$ is a packing ring and $k$ is the mantle surrounding the needle and serving for guide purposes.

In order to couple the air pump to the tire valve A the connecting needle $h$ is simply thrust into the pierced through slot $c$ of the rubber plug $b$ and is introduced into the air channel $i$ of the sleeve $a$. Owing to the elasticity of the rubber plug this insertion requires little force. After the needle $h$ has been withdrawn the slot in the plug or in the diaphragm closes automatically and completely the valve as well as the coupling face in a dust-proof manner. Further the friction generated by the rubber plug contacting with the needle serves for holding the needle in the interior of the plug during the time in which air is pumped into the tire as the pressure caused by air pressure acting on the cross-section of the needle and which tends to drive the needle out of the connecting sleeve is very small. Thus a needle thrust through the rubber plug with small force holds therein against all the customary air pressures used in inflating tires.

I claim:

1. In a device of the type described, a tire valve, a member adapted to be screwed to the tire valve in the manner of a protective cap, and a rubber plug pierced through and normally closing said member and forming an automatic dust-proof packing for the tire valve and adapted to receive the needle-shaped end of the nozzle of an air pump.

2. In a device of the type described, a tire valve, a sleeve provided with screw thread for being screwed to the tire valve in lieu of a protective cap, a rubber plug pierced through and arranged in the free end of said sleeve and adapted to receive the needle-shaped end of the nozzle of an air pump, said rubber plug closing automatically owing to its elasticity when said needle shaped end is withdrawn and forming a dust-proof cap for the tire valve.

3. A device of the type described comprising in combination, a tire valve, a sleeve provided with screw thread screwed to the tire valve in the manner of a protective cap, a rubber plug pierced through and arranged in the free end of said sleeve, an air pump having a needle-shaped nozzle provided with a longitudinal bore and adapted to be pushed through said rubber plug, and a mantle surrounding said needle shaped nozzle and adapted to act as a guide facing cooperating with said sleeve.

4. The combination with a vehicle tire valve of a dust cap detachably mounted thereon, a rubber diaphragm inclosed in said cap and having a perforation normally closed by the elasticity of the rubber.

In testimony whereof, I have signed my name to this specification.

Dr. THEODOR ERISMANN.